United States Patent
Kuwahara

(10) Patent No.: US 6,646,992 B1
(45) Date of Patent: Nov. 11, 2003

(54) COMMUNICATION CONTROL METHOD AND EQUIPMENT FOR IMPLEMENTING THE SAME

(75) Inventor: Masanori Kuwahara, Yokohama. (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1068 days.

(21) Appl. No.: 08/833,302

(22) Filed: Apr. 4, 1997

(30) Foreign Application Priority Data

Apr. 16, 1996 (JP) .............................................. 8-094366

(51) Int. Cl.⁷ .............................................. H04L 12/56
(52) U.S. Cl. .................... 370/249; 370/395.1
(58) Field of Search ................ 370/248, 249, 370/250, 244, 395, 466, 528, 474, 473, 471

(56) References Cited

U.S. PATENT DOCUMENTS

| | | | |
|---|---|---|---|
| 5,227,907 A | * 7/1993 | Rao et al. | 370/473 |
| 5,235,332 A | * 8/1993 | Stephenson, Jr. | 370/476 |
| 5,313,453 A | * 5/1994 | Uchida et al. | 370/248 |
| 5,440,565 A | * 8/1995 | Miyamoto et al. | 370/248 |
| 5,457,700 A | * 10/1995 | Merchant | 370/395 |
| 5,515,386 A | * 5/1996 | Takizawa et al. | 370/395 |
| 5,557,609 A | * 9/1996 | Shobatake et al. | 370/395 |
| 5,602,826 A | * 2/1997 | Yoshimura et al. | 370/248 |

FOREIGN PATENT DOCUMENTS

| JP | 669948 | 3/1994 |
|---|---|---|
| JP | 6216930 | 8/1994 |

* cited by examiner

Primary Examiner—Hassan Kizou
(74) Attorney, Agent, or Firm—Hogan & Hartson, LLP

(57) ABSTRACT

A communication control method inclusively having test function for testing or checking the operations of the communication control equipment at the physical layer in the ATM communication. This communication control method is applied to a communication control system in which data cell sent from an ATM layer control unit is inputted to the transmission system to convert it into frame data to transmit it to the transmission line, and frame data sent from the transmission line is inputted to the receiving system to convert it into data cell to transmit it to the ATM layer control unit, thus to allow data cell inputted to the transmission system to undergo loop-back to deliver it to the receiving system. In the transmission system, the method comprises respectively generating idle cell and test cell, whereby when data cell sent from the ATM layer control unit is delivered, this data cell is outputted, when output of test cell is designated from the external, e.g., host computer, etc. in the case where no data cell exists, the test cell is outputted, and when no data cell exists and output of the test cell is not designated from the external, the idle cell is outputted. Provision of an equipment for implementing such a communication control method permits the physical layer control unit to carry out test by itself without providing evaluation equipment dedicated for test at the external thereof. This contributes to realization of reduced cost and easy maintenance and check.

10 Claims, 5 Drawing Sheets

COMMUNICATION CONTROL METHOD AND EQUIPMENT FOR IMPLEMENTING THE SAME

BACKGROUND OF THE INVENTION

This invention relates to a communication control method and an equipment for implementing the same, and more particularly to a communication control method inclusively having test function for testing (checking) the operation of the equipment (provided for communication control) at the physical layer in the ATM communication, and an equipment for implementing such a method.

In recent years, as a system in which high speed and large capacity data communication can be made, development in regard to the ATM communication is being carried out.

In the ATM communication, a series of data processing within the communication equipment are carried out in the state caused to be of hierarchical (layered) structure consisting of plural protocol (control procedure) layers. In this protocol hierarchical structure, the layer located at the lowest level is the physical layer.

In carrying out such ATM communication, conversion is carried out between the data form at the physical layer, i.e., the data form on the transmission line and the data form at the layer higher than the physical layer. The data form on the transmission line is the form of the frame in conformity with, e.g., SONET/SDH standard, etc. The layer which is higher than the physical layer by one is the ATM layer. The data form in this layer is ATM cell. The ATM cell is data packet having unit length of 53 bytes, and consists of header of 5 bytes in which destination of transmission, etc. is described and payload of 48 bytes in which user data is stored.

The outline of the configuration of a communication control equipment 300 in the physical layer related to this invention is shown in FIG. 1. The communication control equipment 300 includes a receiving system assembled of circuits 305~308, a transmitting system assembled of circuits 301~304, a loop back circuit comprised of a selector 309 provided therebetween, and a host interface 310 for carrying out interface with the host CPU.

In the transmission system, when ATM cell is sent from an ATM layer control unit 400, it is inputted to the transmission cell processing section 302 through the transmission cell interface 301. In the transmission cell processing section 302, after necessary processing is implemented to the header of the ATM cell, the ATM cell thus processed is transferred to the transmission frame assembling section 303. In this case, for a time period during which no data cell is sent to the control equipment 300 of the physical layer (hereinafter referred to as physical layer control unit as occasion may demand) from the ATM layer control unit 400, idle cell indicating that no data cell is sent is generated at the transmission cell processing section 302, and the idle cell thus generated is transferred to the transmission frame assembling section 303 in place of the data cell.

At the transmission frame assembling section 303, data cell or idle cell is converted from the data form of the ATM cell into the data form on the transmission line so that frame data is provided. Thereafter, this frame data is transferred from the transmission line interface 304 to the transmission line.

In the receiving system, frame data represented in the data form on the transmission line is inputted to the receiving frame disassembling section 306 through the receiving line interface 305 and via selector 309 of which detail will be described later. At the receiving frame disassembling section 306, the frame data is disassembled into the portion where cells are stored thereof and the portion of frame management data except for the above. The portion of the frame management data is stored into memory, etc. provided within the receiving frame disassembling section 306. On the other hand, the portion where cells are stored is transferred to the receiving cell processing section 307. At the receiving cell processing section 307, cell synchronization is implemented with respect to the portion where cells are stored so that boundaries between cells are caused to become clear. Thereafter, various processing corresponding to the header pattern are implemented thereto. The result of this processing is indicated at the status register provided within the host interface 310. The cells extracted from the frame data in a manner as described above are outputted to the ATM layer control unit 400 through the receiving cell interface 308.

Meanwhile, data cell or idle dell outputted from the transmission frame assembling section 303 is ordinarily transmitted to the transmission line interface 304. However, in the case where test or check of the internal operation of the control unit 300 is carried out, output of the selector 309 is switched, thereby making it possible to allow the cell to undergo loop back to the receiving frame disassembling section 306. As stated above, the selector 309 is provided for the purpose of test. Ordinarily, output of the receiving line interface 305 is delivered to the receiving frame disassembling section 306.

At the time of test, output of the transmission frame assembling section 303 is delivered to the receiving frame disassembling section 306, whereby data is sent from the transmission system to the receiving system. At the time of carrying out test, output of the selector 309 is initially switched to make such a setting that output of the transmission frame assembling section 303 is delivered to the receiving frame disassembling section 306. Thus, test cell in the form of the ATM cell inputted from the ATM layer control unit 400 to the physical layer control unit 300 is converted into the form of the frame data at the transmission frame assembling section 303. The frame data thus obtained is inputted to the receiving frame disassembling section 306 through the selector 309. At the receiving frame disassembling section 306, the frame data including the test cell therein is disassembled into the portion where cell is stored and the frame management data portion except for the above. Then, processing corresponding to the header pattern is carried out by the receiving cell processing section 307. The processing result obtained at this time is monitored by the host computer through the host interface 310. Thus, the host computer can survey or confirm whether or not the internal processing is normally carried out at the receiving cell processing section 307. In this case, by rewriting, in dependency upon the test purpose, the header pattern of the test cell that the ATM layer control unit 400 delivers to the physical layer control unit 300, tests can be made with respect to various functions. This rewrite operation of the header pattern is carried out by the host computer.

A Alternatively, there were instances where dedicated evaluation equipment is provided at the external in place of the ATM layer control unit 400 to generate test cells by using this equipment to carry out test.

Further, in the physical layer control unit 300, it is also conceivable to input, without using the selector 309, test cell in the form of frame data from the transmission line to the receiving line interface 305 to deliver it to the receiving frame disassembling section 306 and the receiving cell processing section 307. However, also in this case, dedicated evaluation equipment is required. Eventually, the communication control equipment (unit) shown in FIG. 1 requires dedicated evaluation equipment in all of the above-described cases. The reason thereof will be described in detail.

As an item of test carried out by inputting test cell to the physical layer control unit 300 in place of the communication data, there are tests of GFC (General Flow Control) function, bit error correction function of header, and cell counter function, etc. The GFC function is a function for carrying out operation to stop sending-out of transmit data in accordance with the content of the leading 4 bits of the header of the received cell, etc. The bit error correction function of header, is a function to detect and correct error in the case where error takes place in any 1 bit of the header portion of 40 bits. The cell counter function is a function to count the number of valid cells except for invalid cells like idle cell among received plural cells.

In order to test or check such functions, it is necessary to rewrite the header of the test cell in accordance with the test purpose. However, in the communication control equipment shown in FIG. 1, the function to generate test cells corresponding to the purpose of tests to send out them to the portion to be tested was not provided. For this reason, test could not be carried out if the evaluation equipment, etc. is installed at the external of the physical layer control unit.

In order to provide such dedicated evaluation equipment, at the stage for developing the physical layer control unit, development including the evaluation equipment as well is required. Moreover, the evaluation equipment itself is expensive, leading to increased development cost.

In addition, after the test is completed and the communication system in which the physical layer control unit is assembled is transferred to user, it is extremely difficult that user carries out test or check of the physical layer control unit if no dedicated evaluation equipment is provided. It is readily considered that if the communication system is continuously used for a long time period, there result circumstances where any fault takes place in the physical layer control unit, leading to obstacle to communication. However, it was difficult that user carries out maintenance and check of the product.

As stated above, in the case of testing or checking the physical layer control equipment (unit) shown in FIG. 1, it is necessary to provide the dedicated evaluation equipment at the external, leading to increase in the development term and the cost. In addition, it was difficult that user who uses such equipment carries out maintenance and check.

SUMMARY OF THE INVENTION

This invention has been made in view of the above-described circumstances, and its object is to provide a communication control method and equipment therefor which can carry out test by the physical layer control unit itself without providing evaluation equipment dedicated for test at the external of the equipment, and which can reduce the test cost and easily carry out maintenance and check.

A communication control equipment of this invention is directed to an equipment including a transmission system adapted so that data cell sent from an ATM layer control unit is inputted thereto to convert the data cell into frame data to transmit it to transmission line, a receiving system adapted so that frame data sent from the transmission line is inputted thereto to convert the frame data into data cell to transmit it to the ATM layer control unit, and a loop-back line or circuit for carrying out loop-back of data cell inputted to the transmission system to deliver it to the receiving system, wherein the transmission system comprises a transmission cell processing section including: an idle cell generating circuit for generating idle cell to output it; a test cell generating circuit for generating test cell to output it; and selector means operative so that when data cell sent from the ATM layer control unit is delivered thereto, it outputs this data cell, when output of test cell is designated from the external in the case where no data cell exists, it outputs the test cell that the test cell generating circuit outputs, and when no data cell exists and output of the test cell is not designated from the external, it outputs the idle cell that the idle cell generating circuit outputs.

In accordance with this invention, since, within the communication control unit corresponding to the physical layer, it is possible to generate test cell to carry out internal test of the communication control unit, dedicated evaluation equipment for test is unnecessary, thus making it possible to reduce the test time and the cost.

In this case, there may be employed a configuration in which the transmission system includes a transmission cell interface adapted so that data cell sent from the ATM layer control unit is inputted thereto and outputted synchronized with an internal clock of the transmission system, a transmission cell processing section adapted so that the data cell outputted from the transmission cell interface is delivered thereto to implement a predetermined processing thereto to output data thus processed, whereby for a time period during which the data cell is not outputted from the transmission cell interface, the transmission cell processing section generates idle cell to output it, a transmission frame assembling section adapted so that the data cell or the idle cell outputted from the transmission cell processing section is delivered thereto to convert it into frame data to output the frame data thus obtained, and a transmission line interface adapted so that the frame data outputted from the transmission frame assembling section is delivered thereto and transferred to the transmission line, the receiving system includes a receiving line interface adapted so that frame data sent from the transmission line is inputted and outputted, a selector supplied with the frame data outputted from the receiving line interface and the frame data outputted from the transmission frame assembling section, whereby at the time of the ordinary (normal) operation, the selector outputs the frame data outputted from the receiving line interface, and at the time of test, the selector outputs the frame data outputted from the transmission frame assembling section, a receiving frame disassembling section supplied with the frame data outputted from the selector to disassemble it into cell storage portion and frame management data storage portion to output the cell storage portion, a receiving cell processing section supplied with the cell storage portion outputted from the receiving frame disassembling section to implement a predetermined processing thereto to output the cell storage portion thus processed as data cell, and a receiving cell interface supplied with the data cell outputted from the receiving cell processing section, and the idle cell generating circuit, the test cell generating circuit and the selector means is included in the transmission cell processing section.

Alternatively, communication control equipment of this invention comprises, in the transmission system, a transmission cell interface operative so that when data cell is inputted thereto, it generates a valid cell flag signal indicating that valid data cell exists to output the valid cell flag signal along with the data cell, and to generate a cell byte count signal for counting the number of bytes of cell to be outputted to output it, and a transmission cell processing section operative to generate idle cell and test cell to select any one of the data cell, the idle cell and the test cell on the basis of the valid cell flag signal and a test cell sending start signal inputted from the external to output selected one in accordance with the cell byte count signal, wherein the transmission cell processing section includes an idle cell generating circuit for generating idle cell to output it in accordance with the cell byte count signal, a test cell generating circuit supplied with data related to test purpose from the external to generate test cell including this data to output it in accordance with the cell byte count signal, a selector control circuit operative to generate a select signal to select the data cell when the valid cell flag signal is delivered thereto, to select the test cell when the valid cell flag signal is not delivered thereto and the test cell sending start signal is delivered thereto, and to select the idle cell when both the valid cell flag signal and the test cell sending start signal are not delivered thereto to output the select signal, and a selector for selecting any one of the data cell, the idle cell and the test cell on the basis of the select signal to output selected one.

The selector control circuit comprises a sending number of test cells setting register in which the number of test cells to be sent out is set in advance, a sending number of test cells counter for counting the number of the test cells which have been sent out, a comparison circuit for comparing the number set at the sending number of test cells setting register and the number that the sending number of test cells counter has counted to output a reset signal when the number of the test cells which have been sent out reaches the set number, a test cell flag generating circuit operative so that when the test cell sending start signal is delivered thereto, it generates, in accordance with the cell byte count signal, a test cell flag signal for determining timing at which the test cell is sent out to output it, and when the reset signal is delivered thereto, it stops output of the test cell flag signal, and a select signal generating circuit operative to generate a select signal to select the data cell when the valid cell flag signal is delivered thereto, to select the test cell when the valid cell flag signal is not delivered thereto and the test cell flag signal is delivered thereto, and to select the idle cell when both the valid cell flag signal and the test cell flag signal are not delivered thereto, thus to output the select signal to the selector.

Alternatively, the selector control circuit may further comprise a register operative so that when the test cell sending start signal is inputted thereto from the external, it holds the test cell sending start signal to output it, and the test cell flag generating circuit may be such that when the test cell sending start signal is outputted from the register, it generates a test cell flag signal for determining timing at which the test cell is sent out in accordance with the cell byte count signal to output it, and when the reset signal is delivered thereto, it stops output of the test cell flag signal.

A communication control method of this invention is directed to a method in which data cell sent from an ATM layer control unit is inputted to a transmission system to convert it into frame data to transmit the frame data to transmission line, and frame data sent from the transmission line is inputted to a receiving system to convert it into data cell to transmit the data cell to the ATM layer control unit, thus to allow data cell inputted to the transmission system to undergo loop back to deliver it to the receiving system, wherein, in the transmission system, the method comprises generating idle cell to output it, and generating test cell to output it, whereby when data cell sent from the ATM layer control unit is delivered thereto, this data cell is outputted, when output of the test cell is designated from the external in the case where no data cell exists, the test cell that the test cell generating circuit outputs is outputted, and when no data cell exists and output of the test cell is not designated from the external, the idle cell that the idle cell generating circuit outputs is outputted.

Alternatively, a communication control method of this invention is such that, in the transmission system, the method comprises a first step of generating, when data cell is inputted thereto, a valid cell flag signal indicating that valid data cell exists to output it along with the data cell, and generating a cell byte count signal for counting the number of bytes of cell to be outputted, and a second step of generating idle cell and test cell to select any one of the data cell, the idle cell and the test cell on the basis of the valid cell flag signal and a test cell sending start signal delivered from the external to output selected one in accordance with the cell byte count signal, wherein the second step includes a step of generating idle cell to output it in accordance with the cell byte count signal, a step of being supplied with data related to test purpose from the external to generate test cell including this data to output it in accordance with the cell byte count signal, a step of generating a select signal to select the data cell when the valid cell flag signal is given, to select the test cell when the valid cell flag signal is not given and the test cell sending start signal is given, and to select the idle cell when both the valid cell flag signal and the test cell sending start signal are not given to output the select signal, and a step of selecting any one of the data cell, the idle cell and the test cell on the basis of the select signal to output selected one.

The step of generating the select signal to output it includes a step such that the number of test cells to be sent out is set in advance, a step of counting the number of test cells which have been sent out, a step of comparing the number set at the sending number of test cells setting register and the number that the sending number of test cells counter has counted to output a reset signal when the number of the test cells which have been sent out reaches the set number, a step of generating, in accordance with the cell byte count signal, a test cell flag signal for determining timing at which the test cell is sent out to output it, and stopping output of the test cell flag signal when the reset signal is given, and a step of generating a select signal to select the data cell when the valid cell flag signal is given, to select the test cell when the valid cell flag signal is not given and the test cell flag signal is given, and to select the idle cell when both the valid cell flag signal and the test cell flag signal are not given, thus to output the select signal.

DESCRIPTION OF THE PREFERRED EMBODIMENTS

A preferred embodiment of this invention will now be described with reference to the attached drawings.

Figure 1:
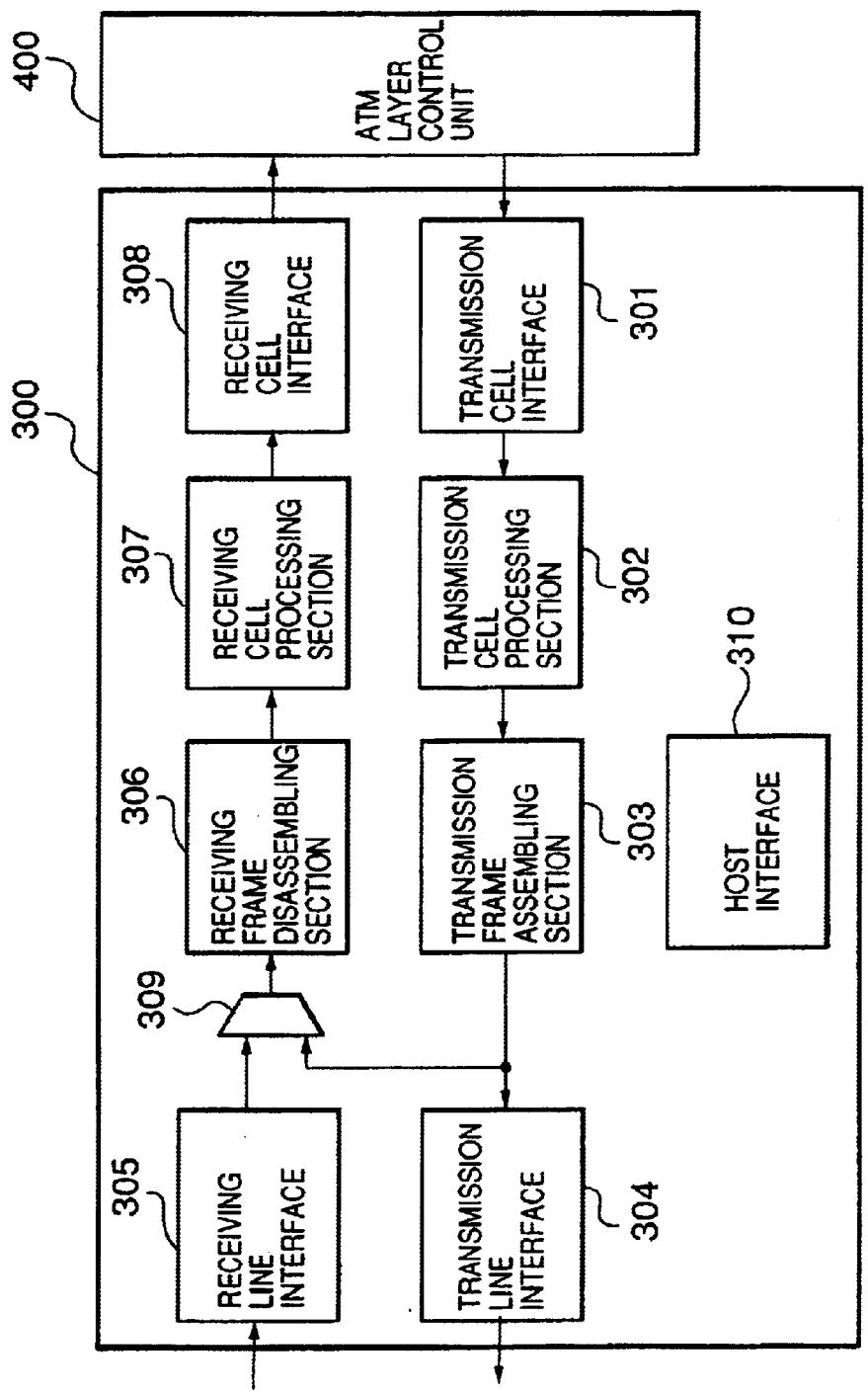
FIG. 1 is a block diagram showing the configuration of a communication control equipment of the physical layer related to this invention.
Figure 2:
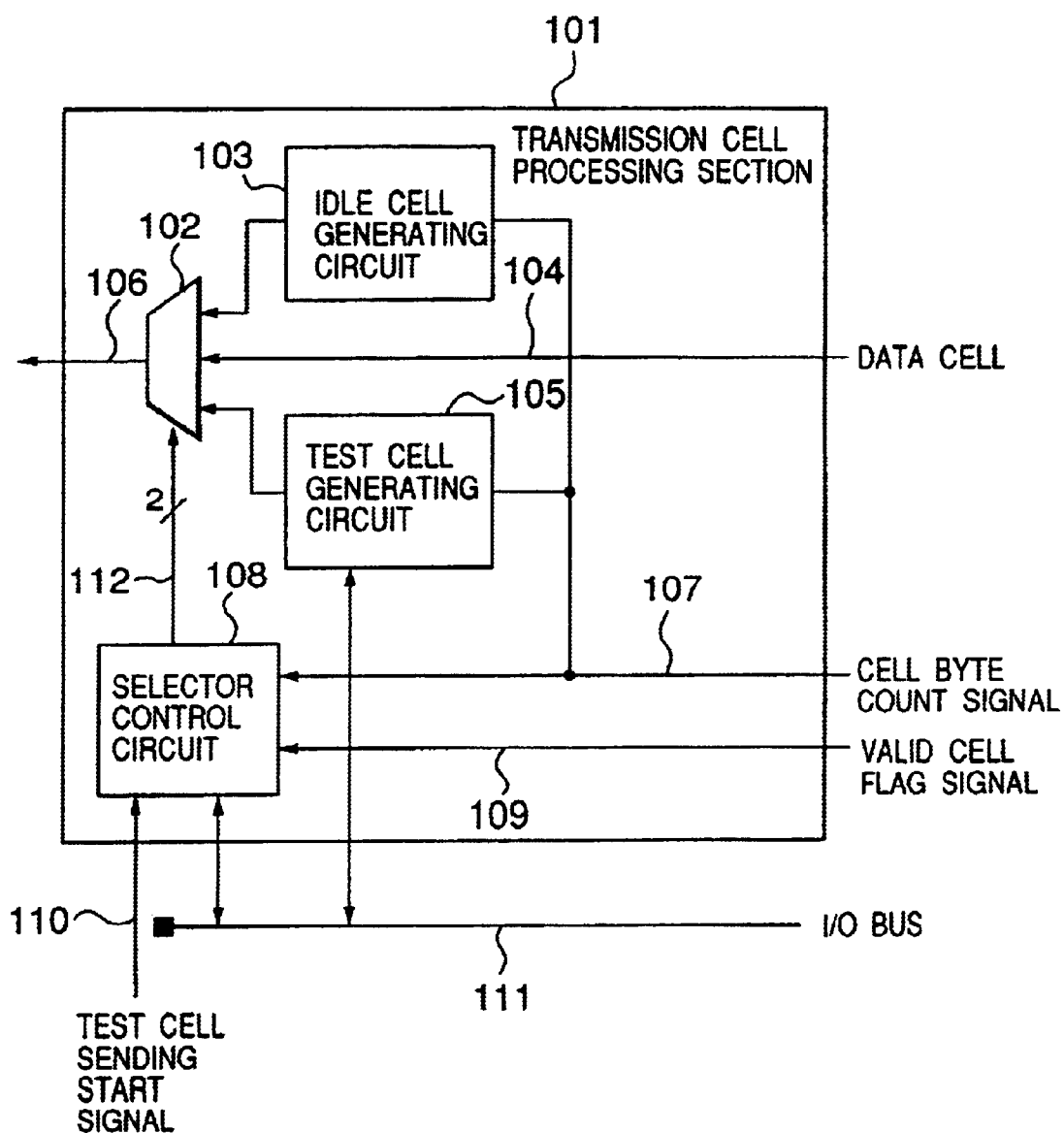
FIG. 2 is a block diagram showing the configuration of a transmission cell processing section that a communication control equipment according to an embodiment of this invention has.

A communication control equipment according to this embodiment comprises a transmission cell processing section 101 shown in FIG. 2. This transmission cell processing section 101 is connected between transmission cell interface 301 and transmission frame assembling section 303 in the entire communication control equipment 100 of the physical layer shown in FIG. 5. As compared to the control equipment (unit) 300 shown in FIG. 1, the physical layer control equipment (unit) 100 is different from the former in the internal configuration of transmission cell processing section 302.

The transmission cell processing section 101 of FIG. 2 includes an idle cell generating circuit 103, a selector 102, a test cell generating circuit 105, and a selector control circuit 108.

The idle cell generating circuit 103 is supplied with, through a signal line 107, a cell byte count signal that the transmission cell interface 301 has generated and outputted to generate idle cell in synchronism with the cell byte count signal to output it to the selector 102. This cell byte count signal indicates which byte of cell is being outputted and indicates value obtained by repeatedly counting 53 bytes corresponding to the byte length of 1 ATM.

The test cell generating circuit 105 is supplied with the cell byte count signal to generate test cell in a manner synchronous therewith to output it to the selector 102. In this example, the test cell generating circuit 105 includes data holding register of 5 bytes for generating the header of the test cell. This data holding register is connected to an I/O bus 111, and is supplied with data transferred from the I/O bus 111 to hold it.

Data cell outputted from the transmission cell interface 301 is delivered to the selector 102 via a signal line 104.

The selector control circuit 108 is supplied with a test cell sending out start signal for designating (instructing) start of sending of the test cell through a signal line 110 from the external such as host computer (not shown), etc. Moreover, the selector control circuit 108 is connected to the I/O bus 111, and serves to hold data delivered through the I/O bus 111 into register included therein. Further, the selector control circuit 108 is operative so that when valid data cell is sent thereto, it is supplied with a valid cell flag signal indicating that fact from the transmission cell interface 301 through a signal line 109. The selector control circuit 108 generates a select signal for controlling determination of any cell to be selected on the basis of the valid cell flag signal and the test cell sending start signal to deliver it to the selector 102 through a signal line 112 of 2 bits.

The selector 102 selects any one of the data cell delivered from the signal line 104, the idle cell delivered from the idle cell generating circuit 103 and the test cell delivered from the test cell generating circuit 105 in accordance with the select signal delivered from the selector control circuit 108 to output selected one to transmission frame assembling section 303 of the succeeding stage through a signal line 106.

Figure 3:
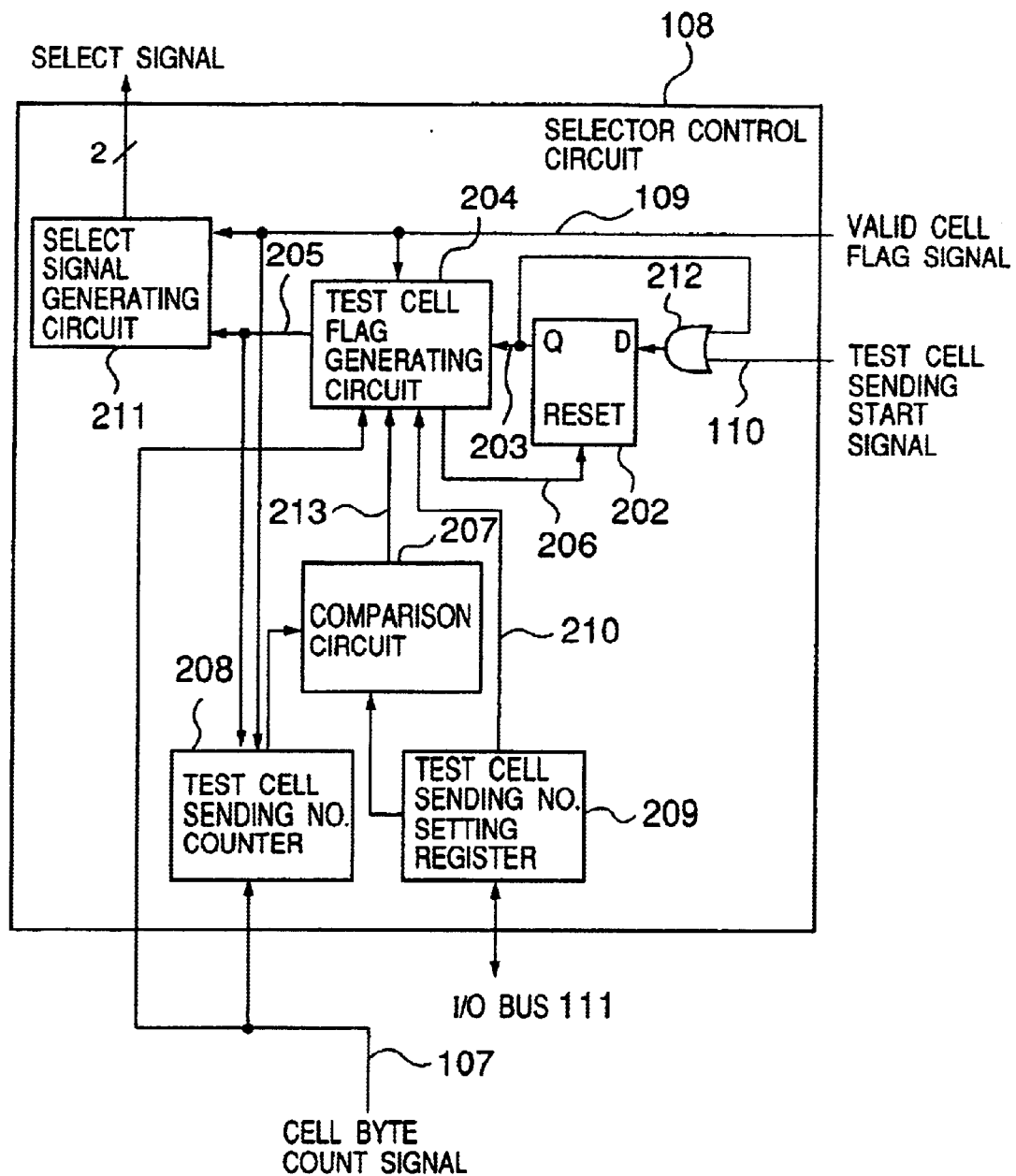
FIG. 3 is a block diagram showing the configuration of a selector control circuit that the transmission cell processing section has.

The detailed configuration of the selector control circuit 108 includes, as shown in FIG. 3, an OR gate 212, a flip-flop 202, a test cell flag generating circuit 204, a select signal generating circuit 211, a comparison circuit 207, a sending number of test cells counter (labeled TEST CELL SENDING NO. COUNTER in the figure) 208, and a sending number of test cells setting register (labeled TEST CELL SENDING NO. SETTING REGISTER in the figure) 209.

As described above, a test cell sending start signal of logic "1" level is inputted to one input terminal of the OR gate 212 through the signal line 110 from the host computer. This test cell sending start signal is inputted to data input terminal D of the flip-flop 202. Moreover, Q output produced in response thereto is delivered to the input terminal of the test cell flag generating circuit 204 through a signal line 203 from output terminal Q, and is also fed back to the other input terminal of the OR gate 212 in synchronism with input timing of clock (not shown). For this reason, also after the level of the test cell sending start signal from the host computer shifts to logic "0" level, output from the flip-flop 202 can be held at logic "1" level.

The sending number of test cells counter 208 is supplied with the cell byte count signal, and is also supplied with the valid cell flag signal from the signal line 109. The sending number of test cells counter 208 is supplied with the cell byte count signal and the valid cell flag signal as described above to count the number of test cells sent to output a count signal to the comparison circuit 207. When valid data cell exists, no test cell is sent out. Accordingly, the sending number of test cells counter 208 does not count operation.

The sending number of test cells setting register 209 is supplied in advance with the number of test cells to be sent out from the I/O bus 111 to hold that number to output it to the comparison circuit 207 and the test cell flag generating circuit 204.

The comparison circuit 207 compares the number of test cells to be sent that the count signal outputted from the sending number of test cells counter 208 indicates with the number of test cells to be sent set at the sending number of test cells setting register 209, whereby when the number that the count signal indicates reaches the set number of test cells to be sent, it notifies the test cell flag generating circuit 204 of the fact.

The test cell flag generating circuit 204 is supplied with the valid cell flag signal, the test cell sending start signal, the cell byte count signal, and the reset signal from the comparison circuit 207. In the case where no valid data cell exists and any test cell or cells to be sent out still remain, the test cell flag generating circuit 204 generates a test cell flag signal which prescribes (provides) timing at which the test cell is sent out to output it to the select signal generating circuit 211 through a signal line 205.

The select signal generating circuit 211 is supplied with the test cell flag signal outputted from the test cell flag generating circuit 204 and the valid cell flag signal outputted from the transmission cell interface 301 through the signal line 109 to generate a select signal of 2 bits which selects any one of the data cell, the idle cell and the test cell to output it to the selector 102. When valid data cell is delivered to the transmission cell processing section 101, the select signal generating circuit 211 outputs a select signal for selecting data cell on the basis of valid cell flag signal indicating the above fact. When no valid data cell is given and no test cell is sent out, the select signal generating circuit 211 outputs a select signal to select idle cell. When no valid data cell exists and the test cell sending start signal is inputted, the select signal generating circuit 211 outputs a select signal to select the test cell.

The operation of the communication control equipment according to this embodiment provided with such a configuration, i.e., the communication control method according to this embodiment will now be described.

Figure 5:
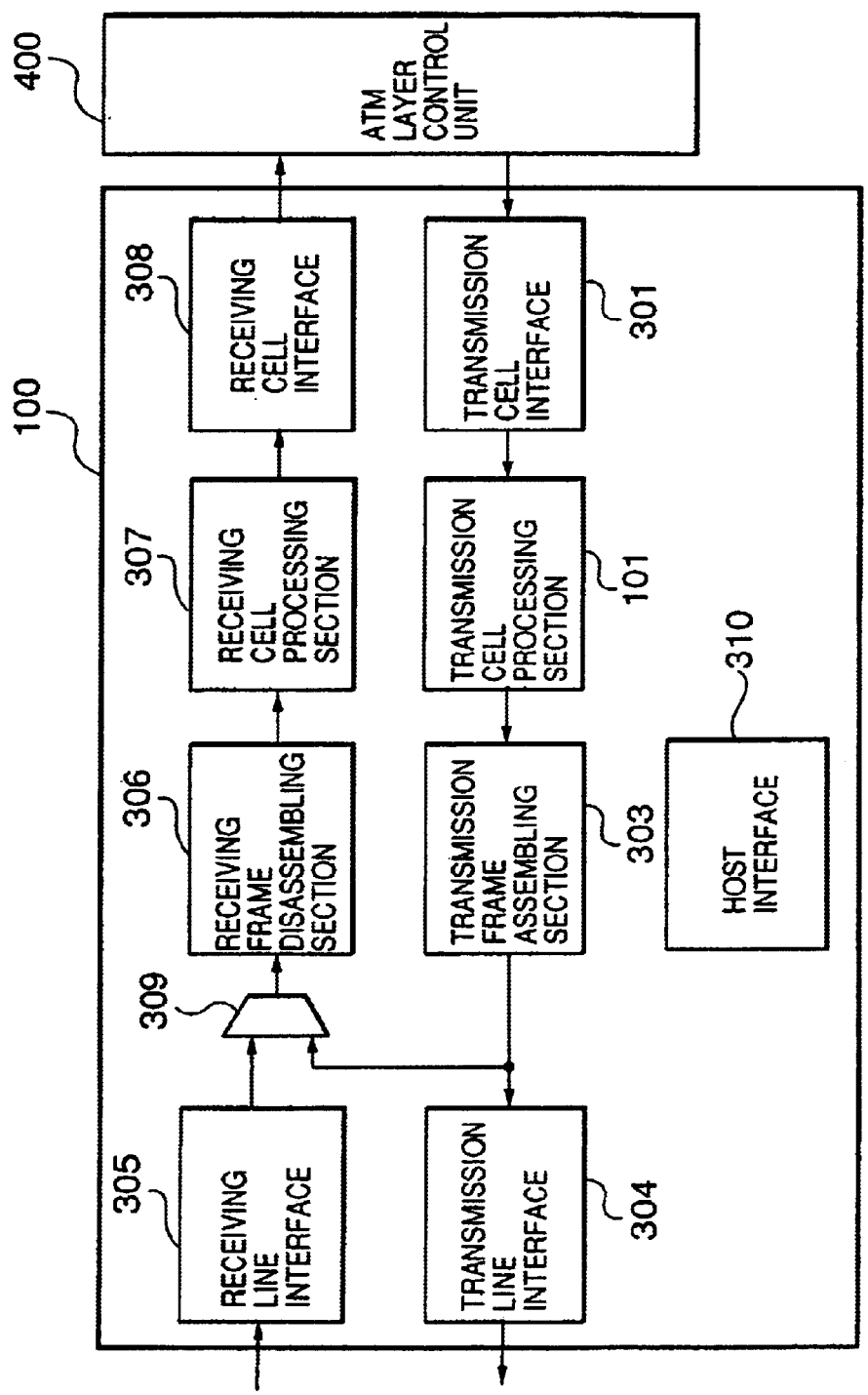
FIG. 5 is a block diagram showing the configuration of a physical layer control unit including the communication control equipment according to the embodiment of this invention.

In FIG. 5, explanation will be given in connection with the case where valid data cell is outputted from the ATM layer control unit 400 and is inputted to the transmission cell interface 301 within physical layer control unit 100. When data cell corresponding to one cell is delivered to the transmission cell interface 301 and is written into the internal cell buffer, a valid cell flag signal of logic "1" level is outputted from the transmission cell interface 301 in synchronism with the timing at which the cell byte counter within the transmission cell interface 301 begins counting count value of the first byte. This valid cell flag signal is delivered to the selector control circuit 108 within the transmission cell processing section 101 shown in FIG. 2. Within the selector control circuit 108, as described above, valid cell flag signal is delivered to the select signal generating circuit 211. Thus, a select signal to select data cell is generated, and the select signal thus generated is outputted to the selector 102. The selector 102 connects the signal lines 104 and 106 to select data cell to output it to the transmission frame assembling section 303.

When there results the state where no valid data cell is inputted to the transmission cell interface 301, the valid cell flag signal is caused to be at logic "0" level. This valid cell flag signal is inputted to the select signal generating circuit 211 within the selector control circuit 108. Thus, a select signal for selecting idle cell is outputted from the select signal generating circuit 211 to the selector 102. The selector 102 connects the output terminal of the idle cell generating circuit 103 and the signal line 106 to output idle cell from the signal line 106 to the transmission frame assembling section 303.

The operation in the case where test cell is inserted into the cell flow to input it to the transmission frame assembling section 303, the selector 309 and the receiving frame disassembling section 306 is as follows. In this embodiment, in the state where the physical layer control unit 100 is not connected to the ATM layer control unit 400 in FIG. 5, it is possible to carry out test by the physical layer control unit 100 by itself. However, in this embodiment, test can be made not only in connection with such a case, but also in the case where the physical layer control unit 100 is connected to the ATM layer control unit 400 similarly to the ordinary system working state. Namely, an approach may be also employed such that in the state where data cell is inputted from the ATM layer control unit 400 to the physical layer control unit 100, or no data cell exists and idle cell is instead generated, test cell is generated within the physical layer control unit 100 to insert it into this cell flow to carry out the internal test.

Initially, data of the cell header suitable for the item to be tested is written from the external of the transmission cell processing section 101 into the register of 5 byte length within the test cell generating circuit 105 through I/O bus 111. Further, data indicating the number of test cells to be sent out at a time is delivered from the I/O bus 111 to the sending number of test cells setting register 209, and is held thereat.

When the test cell sending start signal is inputted to the selector control circuit 108 after such a setting is carried out, test cell is generated in synchronism with the cell byte count signal, and is outputted through the selector 102.

Figure 4:
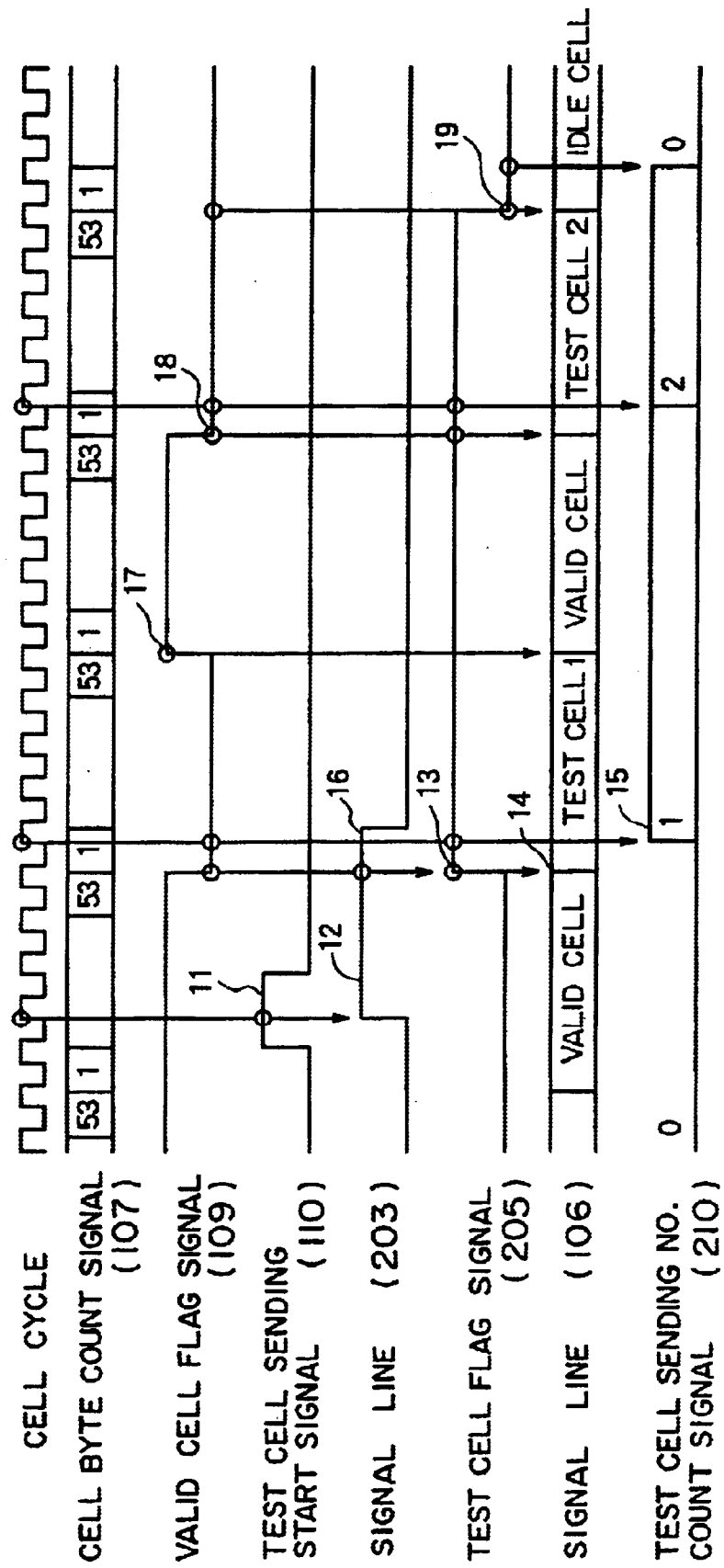
FIG. 4 is a time chart showing operation waveforms of respective signals within the selector control circuit.

The operation of the selector control circuit 108 when selector 102 outputs test cell will now be described with reference to the time chart of FIG. 4 showing operation waveforms of respective signals.

Initially, as indicated by waveform 11 of FIG. 4, test cell sending start signal is inputted from the host computer to the OR gate 212 within the selector control circuit 108 via the signal line 110. The test cell sending start signal is inputted from the OR gate 212 to the flip-flop 202. As a result, the level of the signal line 203 connected to the output terminal shifts to logic "1" level as indicated by waveform 12. As described above, since output of the flip-flop 202 is fed back to the input side via the OR gate 212, also after the level of the test cell sending start signal changes to logic "0" level, the signal line 203 is maintained at logic "1" level.

When the level of the signal line 203 shifts to logic "1" level, the test cell flag generating circuit 204 generates test cell flag signal of logic "1" level as indicated by waveform 13 in synchronism with the timing at which there results the cycle where the cell byte count signal indicates the first byte to output it therefrom. In such an operation, in the case where the valid cell flag signal is at logic "1" level when this test cell flag signal is outputted, it is indicated that data cell to be sent out from the transmission cell interface 301 exists. Thus, in this case, the test cell flag signal is maintained at logic "0" level. When sending of data cell is completed and there results the state where valid data to be sent out to the transmission cell interface 301 does not exist, the test cell flag signal is caused to be at logic "1" level in synchronism with the timing at which there results the cycle where the cell byte count signal indicates the next first byte.

In the case where the test cell flag signal is caused to be at logic "1" level as indicated by waveform 13, a reset signal is inputted from the test cell flag generating circuit 204 to the reset terminal of the flip-flop 202 in synchronism with the timing at which the cycle where the cell byte count signal indicates the first byte is completed. Thus, the level of the signal line 203 connected to the output terminal of the flip-flop 202 changes to logic "0" level as indicated by waveform 16.

When the test cell flag signal is caused to be at logic "1" level, the select signal generating circuit 211 immediately outputs a select signal for selecting test cell to output it to the selector 102. Thus, test cell 1 outputted from the test cell generating circuit 105 is outputted to the signal line 106 via the selector 102 as indicated by waveform 14. When the test cell flag signal is at logic "1" level and the valid cell flag signal is at logic "0" level at the time point when the cycle where the cell byte count signal indicates the first byte is completed, the sending number of test cells setting register 209 counts up the sending number of test cells count signal by one as indicated by waveform 15.

The number of test cells to be sent out at a time is set in advance at the sending number of test cells setting register 209. However, in the case where the valid cell flag signal changes to logic "1" level as indicated by waveform 17 before sending of the set number of test cells is completed, the select signal generating circuit 211 outputs a select signal for selecting data cell to the selector 102. For a time period during which the data cell is outputted, the sending number of test cells count signal is maintained to be the previous value of "1" without being counted up.

When the valid cell flag signal changes to logic "0" level as indicated by waveform 18, the second test cell is selected and is outputted. Thus, the test cell sending No. count signal is counted up so that count value becomes equal to 2.

The comparison circuit 207 compares the test cell sending No. count signal and set value of the test cell sending No.

setting register 209 at the last clock edge of the cell cycle, i.e., at the time point when the cycle where the cell byte count signal indicates the 53rd byte is completed. In the case where the both values are in correspondence with each other, the comparison circuit 207 sends out a reset signal for resetting the test cell flag to the test cell flag generating circuit 204. Thus, the test cell flag signal is caused to be at logic "0" level as indicated by waveform 19. In this way, the operation for sending out the test cell is completed.

In accordance with this embodiment, test cell is generated at the transmission cell processing section 101 within the physical layer control unit 100 to deliver it to the receiving cell processing section 307 within the physical layer control unit 100, thus making it possible to carry out test. Moreover, data of the cell header related to the test purpose is inputted from the external to the test cell generating circuit 105 through the I/O bus, thereby making it possible to freely set header of the test cell. Thus, tests with respect to various tests items can be made as occasion demand. Thus, dedicated evaluation equipment required in the communication control equipment of FIG. 1 is unnecessary. The cost or the time required for developing such equipment, and/or the cost of the equipment itself can be reduced. Thus, reduction in the cost and the time required for test can be made. In addition, since dedicated evaluation equipment is not required also for user who uses the communication control equipment according to this embodiment, it is possible to easily carry out maintenance and check.

The above-described embodiment is presented only for illustrative purpose, but do not limit this invention by any means. While, e.g., the selector control circuit 108 shown in FIG. 3 is provided in this embodiment, this configuration should be considered to be only example. There may be employed various modifications of the circuit configuration having a function to select any one of the data cell, the idle cell and the test cell.

What is claimed is:

1. A communication control equipment used for ATM communication including a transmission system adapted so that data cell sent from an ATM layer control unit is inputted thereto to convert the data cell into frame data to transmit the frame data to transmission line, a receiving system adapted so that the frame data sent from the transmission line is inputted thereto to convert the frame data into data cell to transmit the data cell to the ATM layer control unit, and a loop-back line or circuit for carrying out loop-back of the data cell inputted to the transmission system to deliver the data cell to the receiving system, wherein the transmission system comprises a transmission cell processing section including:

an idle cell generating circuit for generating and outputting idle cell;

a test cell generating circuit for generating and outputting test cell; and selector means operative so that when data cell sent from the ATM layer control unit is delivered thereto, the selector means outputs the data cell, when output of test cell is designated and no data cell exists, the selector means outputs the test cell which the test cell generating circuit outputs, and when no data cell exists and output of the test cell is not designated, the selector means outputs the idle cell which the idle cell generating circuit outputs.

2. A communication, control equipment as set forth in claim 1, wherein the transmission system includes a transmission cell interface adapted so that data cell sent from the ATM layer control unit is inputted thereto and output the data cell synchronized with an internal clock of the transmission system, a transmission cell processing section adapted so that the data cell outputted from the transmission cell interface is delivered thereto to carry out a predetermined processing to output the data cell, whereby for a time period during which the data cell is not outputted from the transmission cell interface, the transmission cell processing section generates and outputs idle cell, a transmission frame assembling section adapted so that the data cell or the idle cell outputted from the transmission cell processing section is delivered thereto to convert the data cell or the idle cell into frame data to output the obtained frame data, and a transmission line interface adapted so that the frame data outputted from the transmission frame assembling section is delivered thereto and transfer the frame data to the transmission line, wherein the receiving system includes a receiving line interface adapted so that frame data sent from the transmission line is inputted thereto and output the frame data, a selector supplied with the frame data outputted from the receiving line interface and the frame data outputted from the transmission frame assembling section, whereby at the time of the ordinary operation, the selector outputs the frame data outputted from the receiving line interface, and at the time of test, the selector outputs the frame data outputted from the transmission frame assembling section, a receiving frame disassembling section supplied with the frame data outputted from the selector to disassemble the frame data into cell storage portion and frame management data storage portion to output the cell storage portion, a receiving cell processing section supplied with the cell storage portion outputted from the receiving frame disassembling section to carry out a predetermined processing to output the cell storage portion thus processed as data cell, and a receiving cell interface supplied with the data cell outputted from the receiving cell processing section and output the data cell synchronized with an internal clock of the ATM layer control unit, and wherein the idle cell generating circuit, the test cell generating circuit and the selector means are included in the transmission cell processing section.

3. A communication control equipment used for ATM communication including a transmission system adapted so that data cell sent from an ATM layer control unit is inputted thereto to convert the data cell into frame data to transmit the frame data to transmission line, a receiving system adapted so that frame data sent from the transmission line is inputted thereto to convert the frame data into data cell to transmit the data cell to the ATM layer control unit, and a loop-back line or circuit for carrying out loop-back of the data cell inputted to the transmission system to deliver the data cell to the receiving system, wherein the transmission system comprises a transmission cell interface operative so that when data cell is inputted thereto, the transmission cell interface generates a valid cell flag signal indicating that valid data cell exists to output the valid cell flag signal along with the data cell, and to generate and output a cell byte count signal for counting the number of bytes of cell to be outputted, and a transmission cell processing section operative to generate idle cell and test cell to select any one of the data cell, the idle cell and the test cell on the basis of the valid cell flag signal and a test cell sending start signal inputted from the external to output selected one in accordance with the cell byte count signal, wherein the transmission cell processing section includes an idle cell generating circuit for generating and outputting idle cell in accordance with the cell byte count signal, a test cell generating circuit supplied with data related to test purpose from the external to generate test cell including this data to output the test cell in accordance with the cell byte count signal, a selector control circuit operative to generate a select signal to select the data cell when the valid cell flag signal is delivered thereto, to select the test cell when the valid cell flag signal is not delivered thereto and the test cell sending start signal is delivered thereto, and to select the idle cell when both the valid cell flag signal and the test cell sending start signal are not delivered thereto, thus to output the select signal, and a selector for selecting any one of the data cell, the idle cell and the test cell on the basis of the select signal to output selected one.

4. A communication control equipment as set forth in claim 3, wherein the selector control circuit comprises a sending number of test cells setting register in which the number of test cells to be sent out is set in advance, a sending number of test cells counter for counting the number of test cells which have been sent out, a comparison circuit for comparing the number set at the sending number of test cells setting register and the number that the sending number of test cells counter has counted to output a reset signal when the number of the test cells which have been sent out reaches the set number, a test cell flag generating circuit operative so that when the test cell sending start signal is delivered thereto, the test cell flag generating circuit generates, in accordance with the cell byte count signal, a test cell flag signal for determining timing at which the test cell is sent out to output the test cell flag signal, and when the reset signal is delivered thereto, the test cell flag generating circuit stops output of the test cell flag signal, and a select signal generating circuit operative to generate a select signal to select the data cell when the valid cell flag signal is delivered thereto, to select the test cell when the valid cell flag signal is not delivered thereto and the test cell flag signal is delivered thereto, and to select the idle cell when both the valid cell flag signal and the test cell flag signal are not delivered thereto, thus to output the select signal to the selector.

5. A communication control equipment as set forth in claim 3, wherein the selector control circuit comprises a sending number of test cells setting register in which the number of test cells to be sent out is set in advance, a sending number of test cells counter for counting the number of test cells which have been sent out, a comparison circuit for comparing the number set at the sending number of test cells setting register and the number that the sending number of test cells counter has counted to output a reset signal when the number of the test cells which have been sent out reaches the set number, a register operative so that when a test cell sending start signal is inputted thereto from the external, the register holds and outputs the test cell sending start signal, a test cell flag generating circuit operative so that when the test cell sending start signal is outputted from the register, the test cell flag generating circuit generates, in accordance with the cell byte count signal, a test cell flag signal for determining timing at which the test cell is sent out to output the test cell flag signal, and when the reset signal is delivered thereto, the test cell flag generating circuit stops output of the test cell flag signal, and a select signal generating circuit operative to generate a select signal to select the data cell when the valid cell flag signal is delivered thereto, to select the test cell when the valid cell flag signal is not delivered thereto and the test cell flag signal is delivered thereto, and to select the idle cell when both the valid cell flag signal and the test cell flag signal are not delivered thereto, thus to output the select signal to the selector.

6. A communication control method for ATM communication in which data cell sent from an ATM layer control unit is inputted to a transmission system to convert the data cell into frame data to transmit the frame data to transmission line, and frame data sent from the transmission line is inputted to a receiving system to convert frame data into data cell to transmit the data cell to the ATM layer control unit, thus to allow data cell inputted to the transmission system to undergo loop-back to deliver data cell to the receiving system, wherein, in the transmission system, the method comprises generating and outputting idle cell, and generating and outputting test cell, whereby when data cell sent from the ATM layer control unit is delivered, the data cell is outputted, when output of test cell is designated and no data cell exists, the test cell that the test cell generating circuit outputs is outputted, and when no data cell exists and output of test cell is not designated from the external, the idle cell that the idle cell generating circuit outputputted.

7. A communication control method for ATM communication in which data cell sent from an ATM layer control unit is inputted to a transmission system to convert the data cell into frame data to transmit the frame data to transmission line, and frame data sent from the transmission line is inputted to a receiving system to convert frame data into data cell to transmit the data cell to the ATM layer control unit, thus to allow data cell inputted to the transmission system to undergo loop-back to deliver the data cell to the receiving system, wherein, in the transmission system, the method comprises a first step of generating, when data cell is inputted thereto, a valid cell flag signal indicating that valid data cell exists to output the valid cell flag signal along with the data cell, and generating a cell byte count signal for counting the number of bytes of cell to be outputted to output the cell byte count signal, and a second step of generating idle cell and test cell to select any one of the data cell, the idle cell and the test cell on the basis of the valid cell flag signal and a test cell sending start signal delivered from the external to output selected one in accordance with the cell byte count signal, wherein the second step includes a step of generating idle cell to output the idle cell in accordance with the cell byte count signal, a step of being supplied with data related to test purpose from the external to generate test cell including this data to output the test cell in accordance with the cell byte count signal, a step of generating a select signal to select the data cell when the valid cell flag signal is given, to select the test cell when the valid cell flag signal is not given and the test cell sending start signal is given, and to select the idle cell when both the valid cell flag signal and the test cell sending start signal are not given, thus to output the select signal, and a step of selecting any one of the data cell, the idle cell and the test cell on the basis of the select signal to output selected one.

8. A communication control method as set forth in claim 7, wherein the step of generating and outputting the select signal includes a step of setting in advance a number of test cells to be sent out in a test cells setting register, a step of counting the number of test cells which have been sent out in a test cells counter, a step of comparing the number in the test cells setting register and the number in the test cells counter to output a reset signal when the number of the test cells which have been sent out reaches the number set in the test cells setting register, a step of generating, in accordance with the cell byte count signal, a test cell flag signal for determining timing at which the test cell is sent out to output the test cell flag, and stopping output of the test cell flag signal when the reset signal is given, and a step of generating a select signal to select the data cell when the valid cell flag signal is given, to select the test cell when the valid cell flag signal is not given and the test cell flag signal is given, and to select the idle cell when both the valid cell flag signal and the test cell flag signal are not given, thus to output the select signal.

9. A communication control equipment as set forth in claim 1, wherein the test cell generating circuit receives cell header data related to a test purpose and sets a header of the test cell in accordance with the test purpose, thereby allowing tests including a desired test protocol to be made.

10. A communication control method as set forth in claim 6, the method further comprising a step of receiving cell header data related to a test purpose into the test cell generating circuit and setting a header of the test cell in accordance with the test purpose, thereby allowing tests including a desired test protocol to be made.

* * * * *